United States Patent
Akcay et al.

(10) Patent No.: US 12,134,459 B2
(45) Date of Patent: Nov. 5, 2024

(54) AIR VEHICLE

(71) Applicant: TUSAS—TURK HAVACILIK VE UZAY SANAYII ANONIM SIRKETI, Ankara (TR)

(72) Inventors: Ali Akcay, Ankara (TR); Hasan Akman, Ankara (TR); Oner Altinbag, Ankara (TR); Sinan Kucuk, Ankara (TR); Ozkan Altay, Ankara (TR)

(73) Assignee: TUSAS—TURK HAVACILIK VE UZAY SANAYII A.S., Ankara (TR)

(\*) Notice: Subject to any disclaimer, the term of this patent is extended or adjusted under 35 U.S.C. 154(b) by 0 days.

(21) Appl. No.: 18/269,132

(22) PCT Filed: May 26, 2021

(86) PCT No.: PCT/TR2021/050490
§ 371 (c)(1),
(2) Date: Jun. 22, 2023

(87) PCT Pub. No.: WO2022/146288
PCT Pub. Date: Jul. 7, 2022

(65) Prior Publication Data
US 2024/0076028 A1    Mar. 7, 2024

(30) Foreign Application Priority Data
Dec. 30, 2020   (TR) .................. 2020/22489

(51) Int. Cl.
*B64C 1/32*    (2006.01)
*B64C 1/14*    (2006.01)

(52) U.S. Cl.
CPC .............. *B64C 1/32* (2013.01); *B64C 1/1476* (2013.01)

(58) Field of Classification Search
CPC ... B64C 1/1476; B64C 1/1484; B64C 1/1492; B64C 1/32; B64D 25/00; B64D 25/08; B64D 25/10; B64F 5/10
(Continued)

(56) References Cited

U.S. PATENT DOCUMENTS 2,832,553 A    4/1958  Wallenhorst
5,205,516 A *  4/1993  Bright .................. B64C 1/1476
                                                    244/121
(Continued)

FOREIGN PATENT DOCUMENTS

EP    0437983 A1    7/1991
GB    743776 A      1/1956
GB    2587360 A *   3/2021    ........... B64C 1/1476

OTHER PUBLICATIONS

International Search Report and Written Opinion for PCT application No. PCT/TR2021/050490, mailed Jun. 14, 2022.
(Continued)

*Primary Examiner* — Joshua E Rodden
(74) *Attorney, Agent, or Firm* — Notaro, Michalos & Zaccaria P.C.

(57) ABSTRACT

An air vehicle has a body and a canopy disposed on the body so as to be able to move relatively to the body and enabling access and providing protection to the cockpit. More than one hook is located on the canopy. More than one pin is located on the body thus enabling the canopy to be fixed to the body by engagement to the book. The canopy has an open position enables access to the cockpit so as to leave a gap between the canopy and the body. The canopy has a closed position in which the canopy contacts the body so that there is almost no gap left between the body and the canopy. The canopy has an locked position in which the canopy is fixed to the body by locking the pin to the hook.

11 Claims, 6 Drawing Sheets

(58) Field of Classification Search
USPC .......................................................... 244/121
See application file for complete search history.

(56) References Cited

U.S. PATENT DOCUMENTS

| | | | | |
|---|---|---|---|---|
| 6,796,528 | B2* | 9/2004 | Wood | B64C 1/1476 |
| | | | | 244/129.4 |
| 11,220,322 | B2* | 1/2022 | Walter | B64C 1/1476 |
| 11,623,730 | B2* | 4/2023 | Walter | B64C 1/32 |
| | | | | 244/122 AF |
| 2004/0159743 | A1* | 8/2004 | Wood | B64C 1/1476 |
| | | | | 244/121 |
| 2004/0159744 | A1* | 8/2004 | Wood | B64F 5/10 |
| | | | | 244/121 |
| 2022/0250733 | A1* | 8/2022 | Walter | B64D 25/00 |

OTHER PUBLICATIONS

International Preliminary Report on Patentability, completed Mar. 16, 2023.
Demand/Request for Preliminary Examination dated Oct. 26, 2022.
Written Opinion of the International Preliminary Examining Authority dated Jan. 31, 2023.
Response to Office Action dated Feb. 20, 2023.
Written Opinion of the International Preliminary Examining Authority dated Nov. 18, 2022.
Response to Office Action dated Jan. 18, 2023.
International Application Status Report generated Jun. 5, 2023.

* cited by examiner

AIR VEHICLE

FIELD

This invention relates to canopies and canopy actuating mechanisms in air and/or space vehicles.

BACKGROUND

In air and/or space vehicles, cockpits are surrounded by transparent structures called canopies and it is intended to isolate noise and meteorological effects, to enhance the visibility and to reduce the friction caused by air flow. By creating a pressurized area within the canopy, it is aimed to protect pilots from atmospheric effects in high-speed flights. Having said this, canopies are considered as a component of pilot rescue systems used to evacuate pilots from air vehicles in emergencies. Canopies are produced from acrylic plastic or polycarbonate materials, which require expertise, by making transparent shaping in order to provide pilots with a good angle of view. The ability of canopies in providing sealing and its lightness are important factors affecting the health of pilots and the performance of air vehicles.

The opening and closing of canopies during the access of pilots to the cockpit and the (jettison) of canopies in emergencies are carried out by actuating mechanisms on the air vehicle. In addition to canopy actuating mechanisms, various systems that enable pilots to be safely ejected out of the air vehicle are also provided in air vehicles and they need to be operated in line with the actuating mechanisms. Today, the opening and closing operations of a canopy are performed by a mechanism, while the process of locking the canopy onto the air vehicle body to ensure sealing is performed by a different mechanism. While the necessary power is provided to the mechanisms by various motors and actuators, the closed and locked states of a canopy are controlled by means of sensors. Since the use of multiple mechanisms and actuators will increase the area occupied within the canopy, it leads to the need to larger cockpit volumes and to an increase in the weight of air vehicles.

The United States patent document U.S. Pat. No. 2,478,714A, which is included in the known state of the art, discloses a canopy mechanism for performing the opening and closing of canopy in order to provide access to the cockpit. It is mentioned that the fixing of the canopy onto the body is carried out by a second mechanism that is different from the mechanism described above. It is described that the canopy locks are released by said second mechanism to ensure an emergency ejection.

Another United States patent document U.S. Pat. No. 2,832,553A, which is included in the known state of the art, relates to aircraft canopies or cockpit enclosures and more particularly to improvements in the actuating, ejecting and locking mechanisms therefor. The present invention is directed to the provision of a light weight, simplified mechanism for actuating an aircraft canopy or enclosure which is positive and foolproof to insure its efficient and effective operation and use for maximum protection of the life of the pilot.

SUMMARY

The air vehicle developed by this invention enables the actuation of the canopy mechanism to be carried out in a more practical, efficient and reliable manner.

Another object of this invention is to realize the actuation of canopies in air and/or space vehicles using a lighter system.

A further object of this invention is to realize an air vehicle that performs the canopy ejection and evacuation operations safer and faster in emergencies.

The air vehicle developed to achieve the object of the invention, as defined in the first claim and in the claims dependent thereon, comprises a air vehicle body with an airplane structure; a canopy in contact-connection with the body, enabling access into the cockpit by carrying out opening and closing and locking motions relative to the body and providing protection for the equipment and air vehicle crew in the cockpit against the air flow and adverse effects of atmospheric conditions; more than one hook provided on the canopy so as to be in contact with the canopy or integrated with the canopy; more than one pin provided on the body, engaging to the hooks to enable the canopy to be locked and fixed onto the body so that the canopy will be prevented from moving as a result of external factors and that no gap will be left between the body and the canopy, and once the contact of the pins with the hooks are cut, enabling the canopy to be moved; an open position (A) wherein the user is enabled to access into the cockpit so that a space will be left between the canopy and the body; a closed position (K) wherein the corresponding working surfaces of the body and canopy almost completely contact to each other so as to enable the canopy to be placed onto the body so that no aperture is left; and a locked position (L) wherein the pins and hooks are interlocked so that the canopy is fixed to the body, its movement is almost completely terminated and an air-proof sealing is provided. The pins are evenly spaced on the body. The hooks are positioned on the canopy so that there is a certain distance between them. When the canopy comes to the locked position from the closed position, the hooks are positioned so that they can match the pins. The process of moving the canopy from the locked position to the closed position is also carried out by the canopy mechanism.

The air vehicle of the invention comprises at least one canopy mechanism enabling the canopy to move from the closed position to the open position and from the open position to the closed position by performing a rotational motion around the axis that provides the connection of the canopy to the body, as well as enabling the canopy in the closed position to be brought to the locked position by performing a horizontal sliding motion along an axis parallel to the body. The canopy can be moved between the open position, the closed position and the locked position by being moved by a single mechanism so that the opening and closing and locking operations of the canopy are carried out by a single mechanism.

In an embodiment of the invention, the air vehicle comprises a J-shaped transmission element, one end of which being connected to the canopy and the other end to the canopy mechanism, triggered by the canopy mechanism, and enabling the canopy to be moved between the open position, the closed position and the locked position by transmitting the force or moment acting on it to the canopy.

In an embodiment of the invention, the air vehicle comprises at least one actuator enabling the actuation of the transmission element and/or canopy mechanism by transmitting the appropriate power according to the commands received from a user. The canopy mechanism or transmission element is disposed in connection with the actuator. A canopy mechanism can be used to transfer the power transmitted by the actuator to the canopy, or the transmission element can be triggered directly. The actuator is also used to overcome the force applied to the mechanism by a limiter while the canopy is brought from the closed position to the open position and to disconnect the contact of a rolling element with a recess.

In an embodiment of the invention, the air vehicle comprises a first canopy mechanism between the actuator and the transmission element to transfer the actuator's motion to the transmission element, a second canopy mechanism that enables the canopy to switch between rotational motion and/or sliding motion, and a transmission element, one end of being connected to the first canopy mechanism and the other end thereof to the second canopy mechanism. The canopy mechanism consists of two parts, the first canopy mechanism and the second canopy, in a fragmented structure, each being connected to one end of the transmission element. The first canopy mechanism is disposed in connection with the actuator and transmission element, performing a rotational motion with the motion of the actuator and transmitting this rotational motion to the transmission element by means of an arm to provide power transmission. When the second canopy mechanism is actuated, it enables the pins to be released from the hooks with the canopy performing a sliding motion almost parallel to the body when the canopy switches from the locked position to the closed position, as well as enables the transmission element to perform a rotational motion around a point where the transmission element is connected to the second canopy mechanism when the canopy moves from the closed position to the open position. In order for the canopy to perform a rotational motion, the freedom of its sliding motion must be limited. To achieve this, the second canopy mechanism is held in a fixed position so that it cannot move. If the motion of the second canopy mechanism is terminated, the canopy can only perform a rotational motion when it is triggered by the first mechanism. The movements of the canopy mechanism are transferred to the canopy through the transmission element. When the canopy switches from the open position to the closed position or from the closed position to the locked position, it performs the motions described above in the opposite direction.

In an embodiment of the invention, the air vehicle comprises at least one limiter disposed in connection with the second canopy mechanism and transmission element, which (i.e. the limiter), while the canopy is moved from the closed position to the open position, applies force to the second canopy mechanism and ensures that the second canopy mechanism remains stationary so as to prevent the canopy from making a sliding motion and to allow it to perform a rotational motion only. The limiter consists of a spring disposed on the second canopy mechanism so as to be in connection with the transmission element. When the canopy is moved from the locked position to the closed position, the spring is compressed as a result of the movement of the second canopy mechanism and when the second mechanism reaches a predetermined position, the movement of the second mechanism is terminated by the force applied to the mechanism by the spring.

In an embodiment of the invention, the air vehicle comprises more than one rolling element in contact with the transmission element on the canopy mechanism from the end of the transmission element that is not connected to the canopy: a recess on the transmission element into which the rolling element is placed and enabled to move in a compatible manner; and a canopy mechanism enabling the canopy to move from the closed position to the open position by performing a rotational motion with the recess contacting the rolling elements. When the recess is in full contact with the rolling element, the end of the transmission element that is not connected to the canopy is located between the two rolling elements, wherein the canopy only has the freedom of rotation. A roller bearing can be used as the rolling element.

In an embodiment of the invention, the air vehicle comprises an inclined surface disposed on the transmission element, enabling a rolling element to be placed into the recess by sliding the transmission element on the rolling element so as to perform a rising movement; and a curved surface enabling the transmission element to perform a rotational motion by being triggered by the actuator between two rolling elements, one of which exerting force to the upper surface of the transmission element and the other one thereof exerting force to the lower surface of the transmission element. When the canopy is in the locked position, the transmission element contacts a rolling element. When the canopy is moved from the locked position to the closed position, the rolling element slides onto the inclined surface and enables the transmission element to rise to the height to be placed in the space between the two rolling elements. This causes the canopy to perform a sliding motion almost parallel to the body. When the rolling element moves and comes to the end of the inclined surface, it sits into the recess, thus enabling the canopy to reach a position where it can only perform a rotational motion between the two rolling elements. The rolling element that contacts the transmission element from its upper side also acts as a stopper preventing the upward movement of the transmission element. The transmission element receives the energy required to perform these movements from an actuator to which it is connected almost from its middle part.

In an embodiment of the invention, the air vehicle comprises a mount with an inclined form on the hook, which, while the canopy is moved from the locked position to the closed position, prevents the upward movement of the pins and limits the rotational motion and rising of the canopy, thereby enabling it to perform a sliding motion, and thus enabling the canopy to be moved from the locked position to the closed position. By means of the mount, the pins are enabled to slidingly move within the hook. When triggered by the actuator, the canopy is prevented from performing a rotational motion by the force acting on the transmission element. When the pin is positioned in the mount, the canopy is allowed to perform a sliding motion only thanks to the inclined form of the mount.

In an embodiment of the invention, the air vehicle comprises at least one tail hook that contacts the body by means of a pin disposed in the body when the canopy is in the locked position; and in the event of an emergency ejection, that enables the canopy to perform a controlled rotational motion around the axis to which the canopy is connected due to the force of air flow, and to be moved away from the body toward the tail part of the air vehicle. The tail hook is disposed at the end of the canopy that does not contact with the transmission element.

In an embodiment of the invention, it comprises a canopy that is opened in almost the opposite direction to the opening direction in which the canopy is opened for access to the cockpit when the air vehicle is on the ground, and is thus removed from the body in emergencies. In order for the pilot to access the cockpit of the air vehicle during normal operation, the canopy is opened forward by rotating around its connections on the nose part of the air vehicle. During the moment of emergency ejection, the canopy is thrown backward by rotating around the tail hook close to the tail part of the air vehicle. The normal opening direction of the canopy and the emergency ejection direction thereof are almost opposite to each other.

In an embodiment of the invention, the air vehicle comprises at least one beam on the body which is disposed along the whole length of the surface on which the canopy contacts the body, and on which the hooks providing the connection of the canopy to the body are provided in an integrated manner, said beam remaining on the body when the canopy leaves the body in the event of an emergency ejection, thereby facilitating the removal of the canopy from the body by decreasing the weight of the canopy. During an emergency ejection, the canopy leaves the beam and is removed from the body, so that the mechanical transmission parts such as the canopy mechanism and transmission element remain on the structure of the air vehicle. Thus, these heavy parts are prevented from causing injury by hitting the pilot during an emergency rescue and the canopy can be removed from the body quickly and easily by making it lighter.

In an embodiment of the invention, the air vehicle comprises at least one explosive between the canopy and the beam, activated in an emergency and enabling the canopy to be detached from the beam and hooks in one piece, thereby preventing at least partially the injuries caused by the canopy parts. The explosive is placed between the beam and glass so that the glass leaves the body without breaking. Thus, the need for special equipment to prevent pilots from being affected by glass parts is reduced.

In an embodiment of the invention, the air vehicle comprises a canopy mechanism having a geometric structure and dimensional properties enabling the canopy to be held stationary in the desired position between the open position and the closed position. Thanks to a first mechanism with precision overcenter feature, the canopy can remain stationary in its current position when the power supplied by the actuator is cut off.

In an embodiment of the invention, the air vehicle comprises a canopy mechanism disposed in the cockpit, a single actuator positioned in connection with the mechanism and/or transmission element for the mobilization of the canopy mechanism being sufficient for the canopy mechanism to be triggered, and by using more than one mechanism and actuator, reducing the need for the volume occupied by the actuation systems and therefore the pressurized volume in the canopy and for position sensors used for the control of the actuator.

BRIEF DESCRIPTION OF THE DRAWINGS

The air vehicle realized to achieve the object of this invention is shown in the accompanying figures, wherein from these figures.

DETAILED DESCRIPTION

Figure 1:
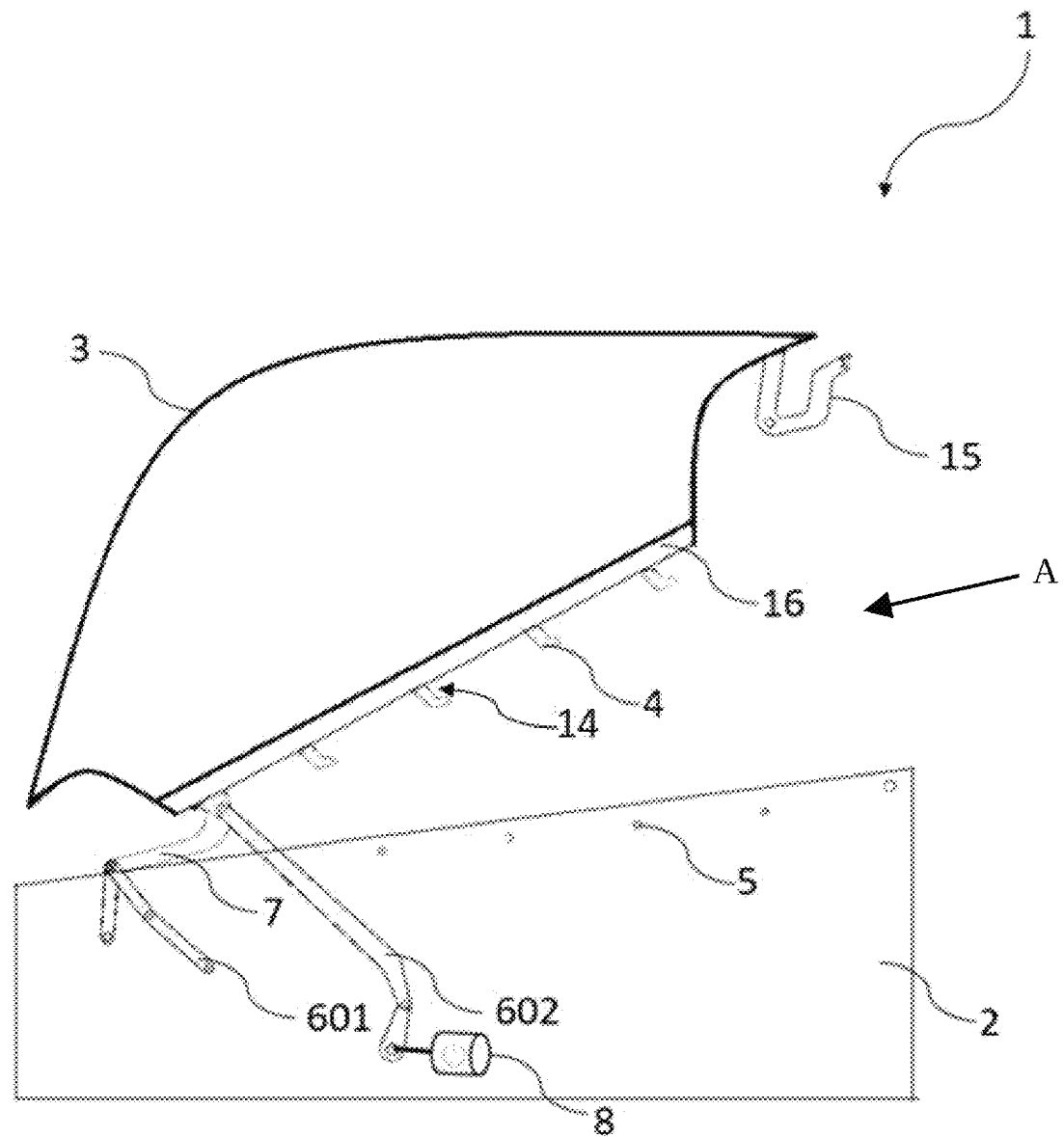
FIG. 1 is a cross-sectional view of an air vehicle when the canopy is in the open position (A).

The parts illustrated in figures are individually assigned a reference numeral and the corresponding terms of these numbers are listed below.
1. Air vehicle
2. Body
3. Canopy
4. Hook
5. Pin
6. Canopy mechanism
    601. First canopy mechanism
    602. Second canopy mechanism
7. Transmission element
8. Actuator
9. Limiter
10. Rolling element
    101. First rolling element
    102. Second rolling element
11. Recess
12. Inclined surface
13. Curved surface
14. Mount
15. Tail hook
16. Beam
17. Explosive
(A) Open position
(K) Closed position
(L) Locked position The air vehicle (1) comprises a body (2); a canopy (3) disposed on the body (2) so as to be able to move relatively to the body (2), enabling access and providing protection to the cockpit; more than one hook (4) provided on the canopy (3); more than one pin (5) provided on the body (2), enabling the canopy (3) to be fixed to the body (2) by engaging to the hook (4); an open position (A) enabling access to the cockpit so as to leave space between the canopy (3) and the body (2); a closed position (K) in which the canopy contacts the body (2) so that there is almost no gap left between the body (2) and the canopy (3); and a locked position (L) in which the canopy (3) is fixed to the body (2) by locking the pin (5) in the hook (4) (FIG. 1).

The air vehicle (1) of the invention comprises at least one canopy mechanism (6) that enables the canopy (3) to move from the closed position (K) to the open position (A) or from the open position (A) to the closed position (K) by a rotational motion and enables the canopy (K) in the closed position (3) to be brought to the locked position (L) by performing a sliding motion on the body (2) (FIG. 1).

There are provided more than one hook (4) evenly spaced on the canopy (3) so as to be integrated with the canopy (3) or to be in connection with the canopy (3), and more than one pin (5) evenly spaced on the body (2), almost completely preventing the movement of the canopy (3) by contacting the hooks (4) when the canopy (3) is brought to the locked position (L). It can move between an open position (A) wherein space is present between the body (2) and canopy (3) to provide access to the cockpit; a closed position (K) wherein almost a complete contact is present between the body (2) and the canopy (3) moved to come from the open position (A); and a locked position (L)

wherein the hooks (4) contact the pins (5) so that the movement of canopy (3) is almost completely terminated and sealing is provided.

There is at least one canopy mechanism (6) enabling the canopy to move from the closed position (K) to the open position (A), from the open position (A) to the closed position (K) by performing a rotational motion around the axis that provides the connection of the canopy (3) to the body (2), as well as enabling the canopy (3) in the closed position (K) to be brought to the locked position (L) by performing a horizontal sliding motion on the body (2) along an axis that is parallel to the body (2). A single canopy mechanism (6) provides the movement of the canopy (3) between the open position (A), closed position (K) and locked position (L), said canopy opening toward the front to create a force against the air flow force that will act on it during the movement of the air vehicle (1).

Figure 2:
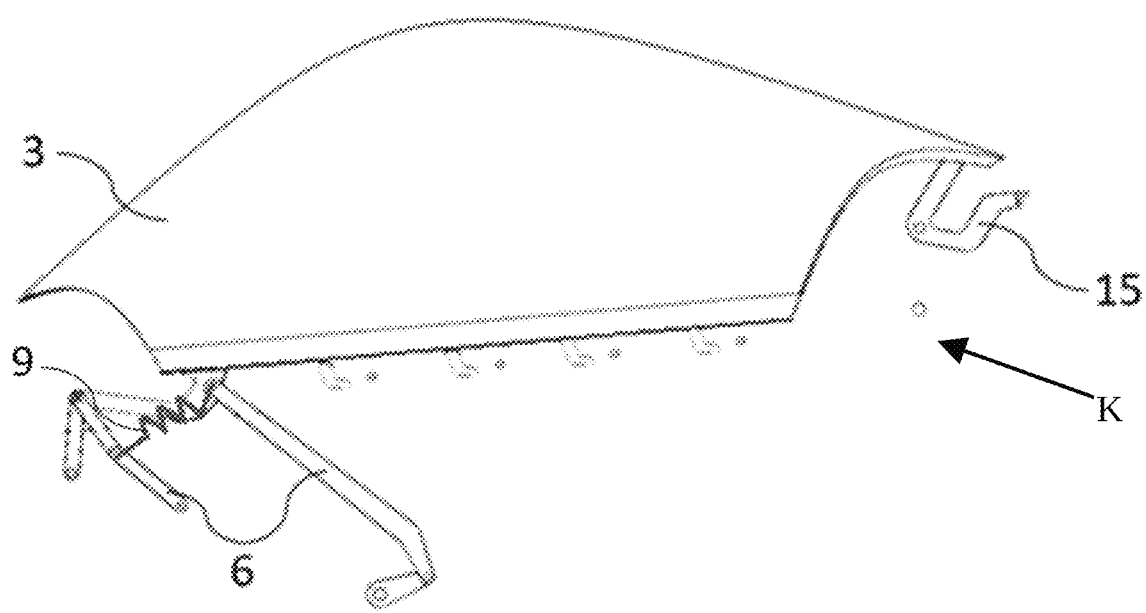
FIG. 2 is a cross-sectional view of an air vehicle when the canopy is in the closed position (K).
Figure 3:
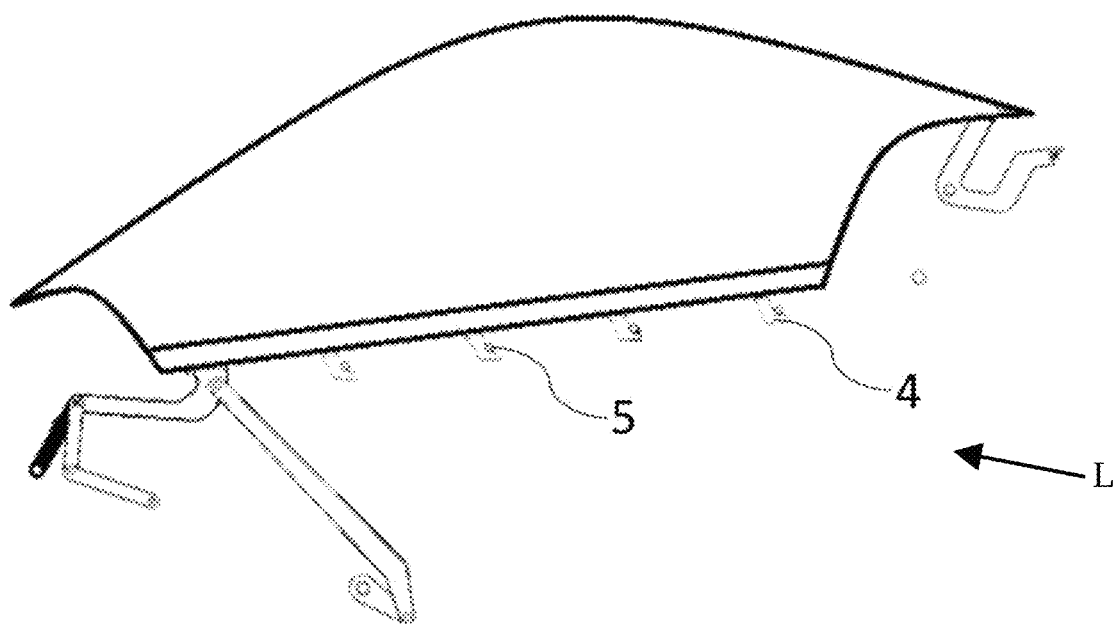
FIG. 3 is a cross-sectional view of an air vehicle when the canopy is in the locked position (L).
Figure 4:
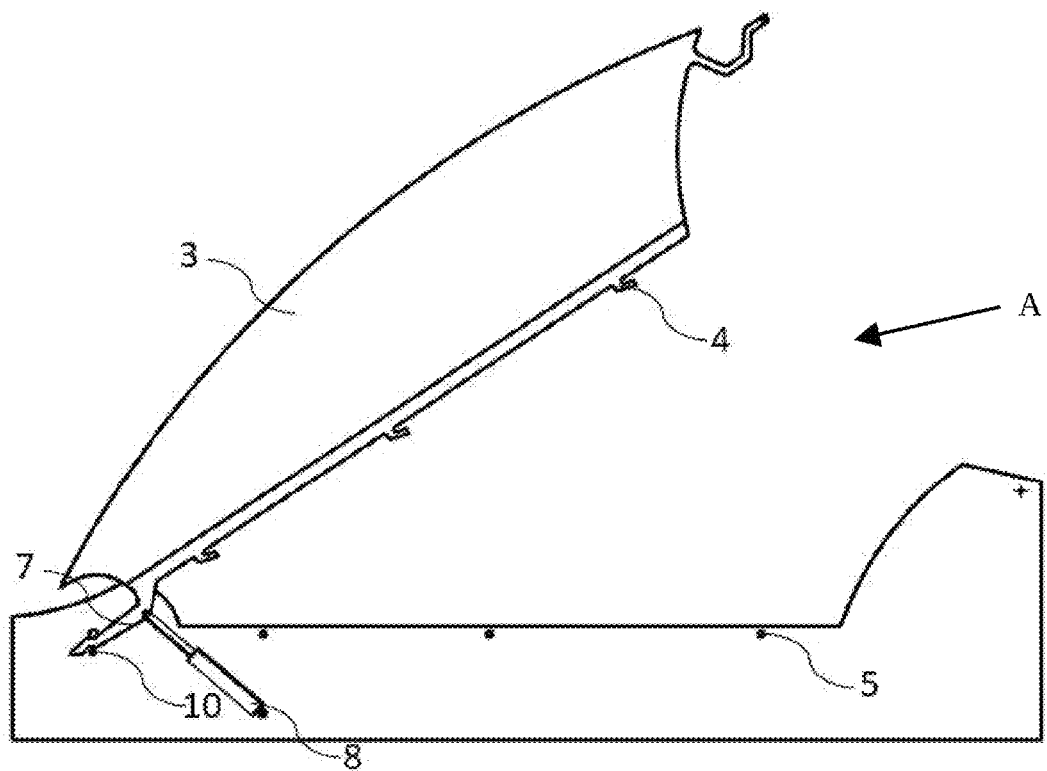
FIG. 4 is a cross-sectional view of an air vehicle when the canopy is in the open position (A).
Figure 5:
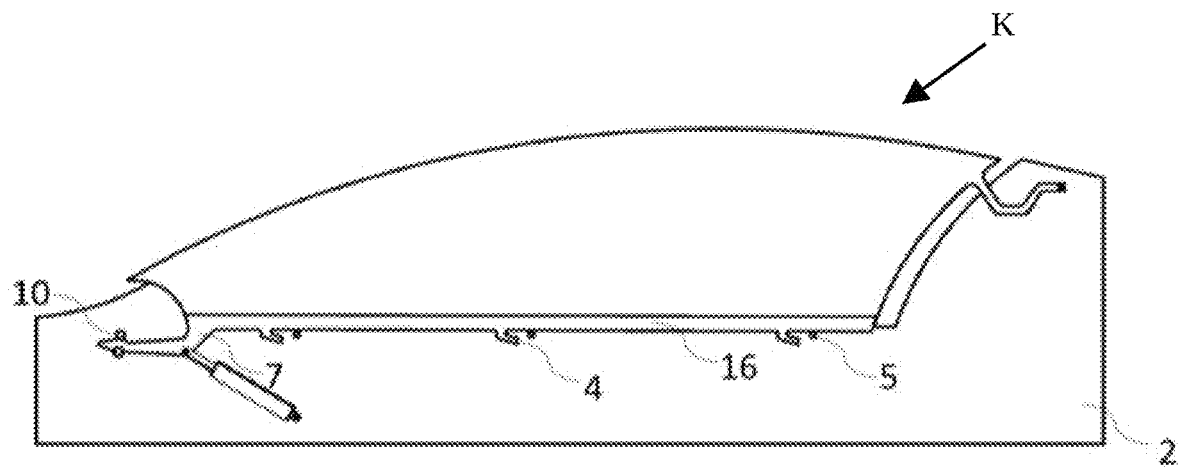
FIG. 5 is a cross-sectional view of an air vehicle when the canopy is in the closed position (K).
Figure 6:
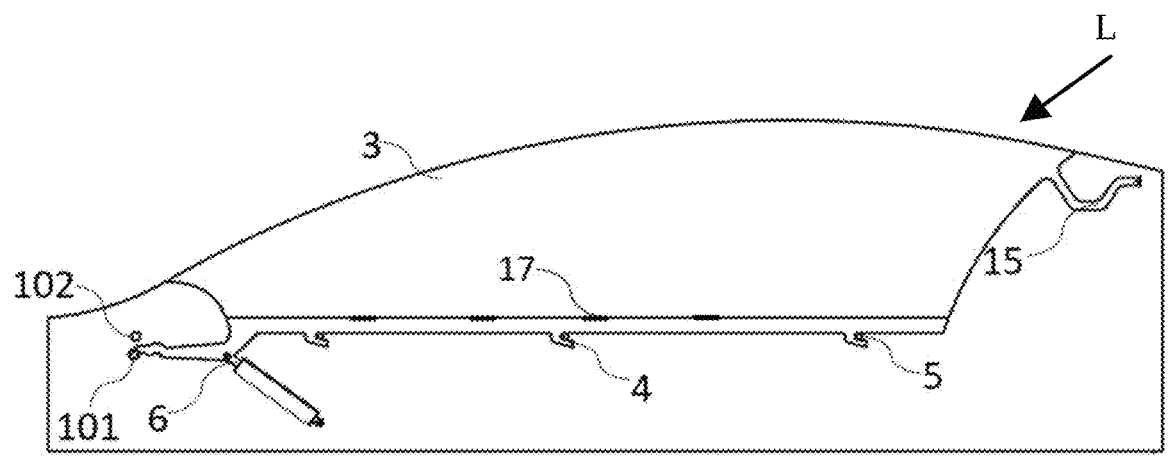
FIG. 6 is a cross-sectional view of an air vehicle when the canopy is in the locked position (L).
Figure 7:
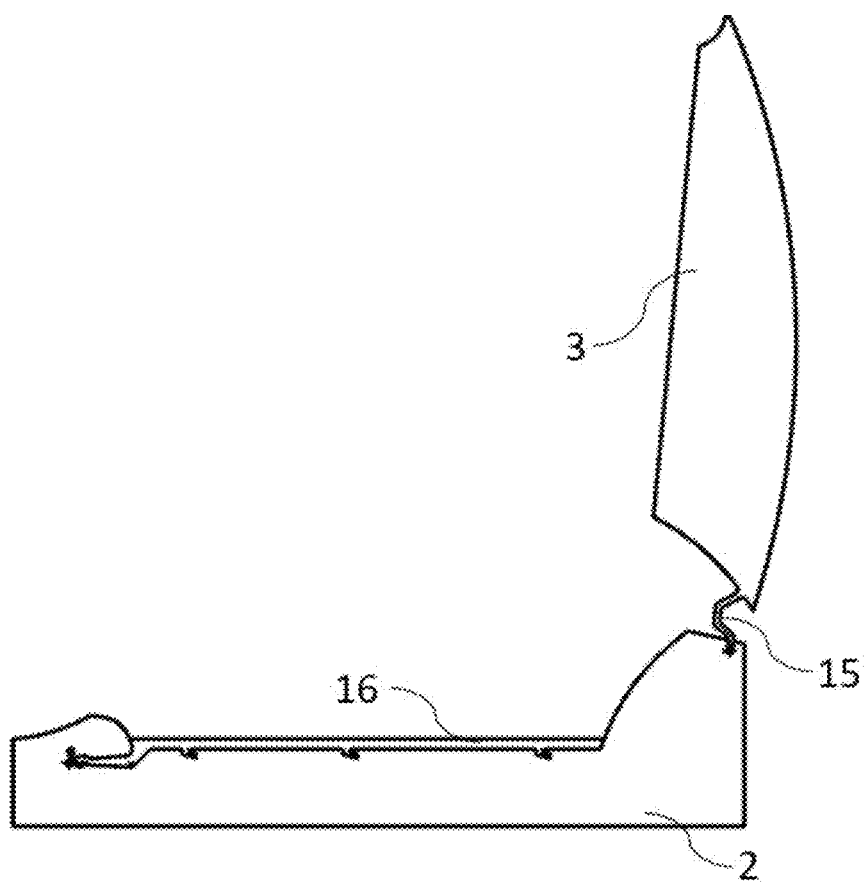
FIG. 7 is a cross-sectional view of an air vehicle when the canopy is in the case of an emergency ejection.
Figure 8:
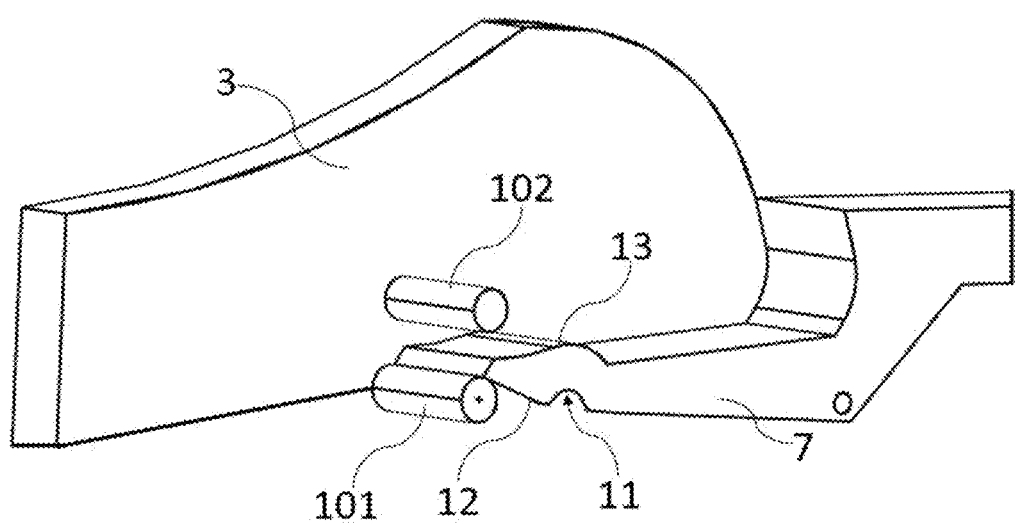
FIG. 8 is a perspective view of the transmission element.

In an embodiment of the invention, the air vehicle (1) comprises a "J" shaped transmission element (7) located between the canopy (3) and the canopy mechanism (6) so as to extend outward from the canopy (3), thereby transferring the movement it receives from the canopy mechanism (6) to the canopy (3). (FIG. 2). The transmission element (7) is located with one end connected to the canopy (3) and the other end to the canopy mechanism (6), thereby being triggered by the canopy mechanism (6) and/or by the actuator (8) and enabling the canopy (3) to be actuated.

In an embodiment of the invention, the air vehicle (1) comprises at least one actuator (8) providing the power required to actuate the transmission element (7) and/or the canopy mechanism (6) according to the commands received from the user. With the actuation of the actuator (8), the transmission element (7) can be triggered directly or through the canopy mechanism (6) (FIG. 2).

In an embodiment of the invention, the air vehicle (1) comprises a first canopy mechanism (601) in connection with the actuator (8) and the transmission element (7) to transfer the actuator's (8) actuation to the transmission element (7), a second canopy mechanism (602) that enables the canopy (3) to switch between rotational motion and/or sliding motion, and a transmission element (7), one end thereof being connected to the first canopy mechanism (601) and the other end thereof to the second canopy mechanism (602). The first canopy mechanism (601) is located in connection with the actuator (8) and the transmission element (7), performing a rotational motion and transmitting this rotational motion to the transmission element (7) by means of an arm to enable the canopy (3) to be actuated. While the second canopy mechanism (602) is in motion, the canopy (3) enables the pins (5) to be released from the hooks (4) by performing a sliding motion almost parallel to the body (2) to move from the locked position (L) to the closed position (A) or from the closed position (K) to the locked position (L). When the motion of the second canopy mechanism (602) is terminated, the canopy (3) can move from the open position (A) to the closed position (K) or from the closed position (K) to the open position (A) by performing a rotational motion around the point where the transmission element (7) is connected to the second canopy mechanism (602) (FIG. 2).

In an embodiment of the invention, the air vehicle (1) comprises at least one limiter (9) located between the second canopy mechanism (602) and the transmission element (7), which almost completely prevents the canopy (3) from moving by applying force onto the second canopy mechanism (602) while the canopy is in the closed position (K), thereby allowing the canopy (K) in the closed position (3) to perform a rotational motion by limiting its sliding motion. The limiter (9) consists of a spring disposed on the second canopy mechanism (602) so as to be in connection with the transmission element (7). When the canopy (3) switches from the locked position (L) to the closed position (K), the spring is compressed as a result of the movement of the second canopy mechanism (602) and when the second canopy mechanism (602) reaches a predetermined position by the user, the movement of the second canopy mechanism (602) is terminated by the force applied to the mechanism by the spring.

In an embodiment of the invention, the air vehicle (1) comprises more than one rolling element (10) in contact with the transmission element (7) on the canopy mechanism (6), a recess (11) provided on the transmission element (7), having a form that is compatible with the rolling element (10), and a canopy mechanism (6) enabling the canopy (3) to move from the closed position (K) to the open position (A) by performing a rotational motion with the rolling element (10) contacting the recess (11). When the recess (11) is in full contact with the rolling element (10), the end of the transmission element (7) that is not connected to the canopy (3) is located between the two rolling elements (10), in which case the canopy (3) being only able to perform a rotational motion.

In an embodiment of the invention, the air vehicle (1) comprises an inclined surface (12) provided on the transmission element (7), enabling the transmission element (7) to be positioned between two rolling elements (101, 102) so as to contact the recess (11) by moving on the rolling element (10), and a curved surface (13) enabling the transmission element (7) to perform a rotational motion between the two rolling elements (101, 102). While the canopy (3) is brought from the locked position (L) to the closed position (K), the rolling element (10) moves on the inclined surface (12), enabling the transmission element (7) to be elevated and placed between the first rolling element (101) and the second rolling element (102), and at the same time, enabling the canopy (3) to perform a sliding motion that is almost parallel to the body (2). When the rolling element (10) is placed in the recess (11), the canopy (3) can perform a rotational motion between the first rolling element (101) and the second rolling element (102). The rolling element (10) that contacts the transmission element (7) from its upper side at the same time prevents the upward movement of the transmission element (7).

In an embodiment of the invention, the air vehicle (1) comprises a mount (14) with an inclined form on the hook (4), enabling the canopy (3) in the locked position (L) to perform a sliding motion by limiting its rotational motion while the canopy (K) is brought to the closed position (K), thereby enabling the canopy (3) to be brought from the locked position (L) to the closed position (K). Thanks to its inclined form, the mount (14) almost completely prevents the canopy (3) from performing a rotational motion, allowing the canopy (3) to move on the horizontal axis with the pin (5) sliding in the mount (14).

In an embodiment of the invention, the air vehicle (1) comprises at least one tail hook (15) that is positioned in contact with the body (2) when the canopy (3) is in the locked position (L), enabling the canopy (3) to be moved away from the body (2) toward the tail part of the air vehicle (1) by performing a controlled rotational motion around the axis to which it is connected by means of air flow force in the event of an emergency ejection. In this way, the canopy (3) is almost completely prevented from hitting the pilot in an emergency evacuation.

In an embodiment of the invention, the air vehicle (1) comprises a canopy (3) that is opened almost in the opposite direction to the direction in which it is moved from the closed position (K) to the open position (A) in the event of an emergency ejection and is moved away from the body (2). The motion performed by the canopy (3) to be brought from the closed position (K) to the open position (A) while the air vehicle (1) is on the ground and the opening motion performed by the canopy to be removed from the body (2) while the air vehicle is in the air during an emergency are almost opposite to each other. In this way, it is facilitated to remove the canopy (3) from the air vehicle (1) by air flow. In an embodiment of the invention, the air vehicle (1) comprises at least one beam (16) that is located on the canopy (3) so as to extend lengthwise thereon, said beam having hooks (4) on itself that connect the canopy (3) to the body (2), wherein the beam remains on the body (2) when the canopy (3) is removed from the body in the event of an emergency ejection, thereby facilitating the removal of the canopy (3) from the body (2) by decreasing the weight of the canopy. As a result of keeping mechanical transmission parts such as the canopy mechanism (6), the transmission element (7) on the structure of the air vehicle, these heavy parts are prevented from causing injury by hitting the pilot during an emergency rescue, and the canopy (3) is thus made more lightweight so that it can be removed from the body (2) in a quick and easy manner.

In an embodiment of the invention, the air vehicle (1) comprises at least one explosive (17) between the canopy (3) and the beam (16), activated in an emergency and enabling the canopy (3) to be detached from the beam (16) and hooks (4) in one piece, thereby preventing at least partially the injuries caused by the parts of the canopy (3). Thus, the need for pilots to wear special clothes to protect themselves from glass fractures is reduced.

In an embodiment of the invention, the air vehicle (1) comprises a canopy mechanism (6) that enables the canopy (3) to be held stationary in the desired position between the open position (A) and the closed position (K). With a canopy mechanism (6) having a precision overcenter feature, the canopy (3) can remain stationary when the power supplied by the actuator (8) is cut off.

In an embodiment of the invention, the air vehicle (1) comprises a canopy mechanism (6) located in the cockpit, enabling the canopy (3) to be actuated by a single actuator (8), thereby reducing the pressurized volume and the need for a position sensor.

The invention claimed is:
1. An air vehicle (1) comprising:
a body (2);
a canopy (3) disposed on the body (2) so as to be able to move relatively to the body (2), enabling access and providing protection to a cockpit;
more than one hook (4) provided on the canopy (3);
more than one pin (5) provided on the body (2), enabling the canopy (3) to be fixed to the body (2) by engaging a respective one of the pins (5) with a respective one of the hooks (4);
an open position (A) enabling access to the cockpit so as to leave a gap between the canopy (3) and the body (2);
a closed position (K) in which the canopy contacts the body (2) so that there is almost no gap left between the body (2) and the canopy (3);
a locked position (L) in which the canopy (3) is fixed to the body (2) by locking the pins (5) to the hooks (4);
at least one canopy mechanism (6) that enables the canopy (3) to switch from the closed position (K) to the open position (A) or from the open position (A) to the closed position (K);
a J-shaped transmission element (7) located between the canopy (3) and the canopy mechanism (6) so as to extend outward from the canopy (3), thereby transferring the movement the transmission element (7) receives from the canopy mechanism (6) to the canopy (3);
two rolling elements (101, 102) disposed on the canopy mechanism (6) so as to be in contact with the transmission element (7);
a recess (11) provided on the transmission element (7), having a form that is compatible with one of the rolling elements (101, 102), wherein the at least one canopy mechanism (6) enables the canopy (3) to switch from the closed position (K) to the open position (A) or from the open position (A) to the closed position (K) by performing a rotational motion when the one of the rolling elements (101, 102) and the recess (11) contact each other and enables the canopy (3) in the closed position (K) to be brought to the locked position (L) by performing a sliding motion on the body (2);
an inclined surface (12) provided on the transmission element (7), enabling the transmission element (7) to be positioned between the two rolling elements (101, 102); and
on the transmission element (7) enabling the transmission element (7) to perform a rotational motion between the two rolling elements (101, 102).

2. The air vehicle (1) as claimed in claim 1, comprising at least one actuator (8) providing power required to actuating the transmission element (7) and/or the canopy mechanism (6) according to commands received from a user.

3. The air vehicle (1) as claimed in claim 2, comprising a first canopy mechanism (601) placed in connection with the actuator (8) and the transmission element (7) to transfer the actuator's (8) movement to the transmission element (7), and a second canopy mechanism (602) that enables the canopy (3) to switch between rotational and/or sliding motions, the transmission element (7) being provided so as to be connected with one end thereof to the first canopy mechanism (601) and with another end thereof to the second canopy mechanism (602).

4. The air vehicle (1) as claimed in claim 3, comprising at least one limiter (9) disposed between the second canopy mechanism (602) and the transmission element (7), said limiter almost completely preventing the canopy (3) from moving by applying force onto the second canopy mechanism (602) while the canopy is in the closed position (K), thereby allowing the canopy (3) in the closed position (3) to perform a rotational motion by limiting its sliding motion.

5. The air vehicle (1) as claimed in claim 1, comprising a mount (14) with an inclined form on the hook (4), enabling the canopy (3) in the locked position (L) to perform a sliding motion by limiting its rotational motion while the canopy (3) is brought to the closed position (K), thereby enabling the canopy (3) to be brought from the locked position (L) to the closed position (K).

6. The air vehicle (1) as claimed in claim 1, comprising at least one tail hook (15) that is positioned so as to contact the body (2) when the canopy (3) is in the locked position (L), enabling the canopy (3) to be removed from the body (2) toward a tail part of the air vehicle (1) by performing a rotational motion in an event of an emergency ejection.

7. The air vehicle (1) as claimed in claim 1, wherein in an event of an emergency ejection, the canopy (3) is configured to move away from the body (2) by opening in an opposite direction to a direction it moves while being from the closed position (K) to the open position (A).

8. The air vehicle (1) as claimed in claim 1, comprising at least one beam (16) located on the canopy (3) so as to extend lengthwise thereon, said beam having the hooks (4) on itself that provide the connection of the canopy (3) to the body (2), wherein the beam remains on the body (2) when the canopy (3) is removed from the body (2) in an event of an emergency ejection, thereby facilitating the removal of the canopy (3) from the body (2) as a result decreasing a weight of the canopy.

9. The air vehicle (1) as claimed in claim 8, comprising at least one explosive (17) disposed between the canopy (3) and the beam (16), activated in an emergency, thereby enabling the canopy (3) to be disconnected in one piece from the beam (16) and hooks (4) and preventing at least partially the injuries caused by parts of the canopy (3).

10. The air vehicle (1) as claimed in claim 1, wherein the canopy mechanism (6) has a geometric structure and dimensional properties, enabling the canopy (3) to be held stationary at a desired position between the open position (A) and the closed position (K).

11. The air vehicle (1) as claimed in claim 2, wherein the canopy mechanism (6) is disposed in the cockpit, enabling the canopy (3) to be triggered and actuated by a single actuator (8), thereby reducing the pressurized volume and the need for a position sensor.

* * * * *